(12) United States Patent
Kimura

(10) Patent No.: US 11,530,319 B2
(45) Date of Patent: Dec. 20, 2022

(54) RUBBER COMPOSITION AND PNEUMATIC TIRE USING THE SAME

(71) Applicant: Toyo Tire Corporation, Itami (JP)

(72) Inventor: Takuya Kimura, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 247 days.

(21) Appl. No.: 17/095,932

(22) Filed: Nov. 12, 2020

(65) Prior Publication Data

US 2021/0163718 A1 Jun. 3, 2021

(30) Foreign Application Priority Data

Dec. 2, 2019 (JP) .............................. JP2019-218185

(51) Int. Cl.
*C08L 7/00* (2006.01)
*B60C 1/00* (2006.01)
*B60C 11/00* (2006.01)

(52) U.S. Cl.
CPC .............. *C08L 7/00* (2013.01); *B60C 1/0016* (2013.01); *B60C 11/0008* (2013.01); *B60C 2011/0025* (2013.01)

(58) Field of Classification Search
CPC .............. C08L 7/00; B60C 1/00; B60C 11/00

USPC ........................................................ 523/156
See application file for complete search history.

(56) References Cited

U.S. PATENT DOCUMENTS

2018/0346694 A1* 12/2018 Fukunishi ............... C08L 13/00
2019/0062536 A1 2/2019 Kimura et al.

FOREIGN PATENT DOCUMENTS

| JP | 2017-110069 A | 6/2017 | |
|---|---|---|---|
| JP | 2017-149885 A | 8/2017 | |
| JP | 2019-112560 A | 7/2019 | |
| WO | WO-2017104135 A1 * | 6/2017 | .............. B60C 1/00 |

* cited by examiner

*Primary Examiner* — Deve V Hall
(74) *Attorney, Agent, or Firm* — WHDA, LLP

(57) ABSTRACT

There is provided a rubber composition which can provide a tire having an excellent balance of the breaking properties, the rolling resistance performance (low fuel consumption) and the wet grip performance. The rubber composition includes 100 parts by mass of a diene rubber, and 1 to 100 parts by mass of fine particles (A) having a glass transition point of −70° C. to 0° C. and composed of a polymer comprising constituent units of at least one monofunctional monomer. The fine particles (A) have a crosslinked structure crosslinked by at least one polyfunctional monomer having a polysulfide bond in which at least two successive sulfur atoms are bonded together.

16 Claims, No Drawings

RUBBER COMPOSITION AND PNEUMATIC TIRE USING THE SAME

TECHNICAL FIELD

The present invention relates to a rubber composition and a pneumatic tire using the rubber composition.

BACKGROUND ART

Rubber compositions used for tires are conventionally required to balance, at a high level, the grip performance on a wet road surface (wet grip performance) with the rolling resistance performance contributing to low fuel consumption. However, these characteristics conflict with each other, and therefore it is not easy to simultaneously improve both of them.

To address this problem, patent document 1 has proposed a rubber composition comprising 100 parts by mass of a rubber component composed of a diene rubber, and 1 to 100 parts by mass of fine particles having a glass transition point of −70 to 0° C. and an average particle size of not less than 10 nm and not more than 100 nm, and composed of a (meth)acrylate polymer having a constituent unit represented by formula (1) and having no reactive silyl group. The rubber composition is reported to enhance the wet grip performance while preventing a decrease in the hardness at room temperature, an increase in the modulus of elasticity at low temperature and a deterioration in the rolling resistance performance. However, such a rubber composition sometimes suffers deterioration in the breaking properties.

On the other hand, patent document 2 describes a tire rubber composition comprising 100 parts by mass of a rubber component composed of a diene rubber, and 1 to 100 parts by mass of crosslinked polymer particles having, as a constituent unit, an alkyl (meth)acrylate unit represented by formula (1), in which the ratio (MS/ML) of the particle size (MS) of the polymer particles when swollen with toluene to the latex particle size (ML) is 1.20 to 10.0. The rubber composition is reported to enhance the wet grip performance while preventing a deterioration in the breaking properties and a deterioration in the rolling resistance performance (low fuel consumption).

However, no interaction occurs between the polymer particles and the rubber component in the rubber composition of patent document 2, and there is room for improvement in the breaking properties.

Patent document 3 describes a tire rubber composition comprising (i) an elastomer which is vulcanizable with sulfur, (ii) carbon black and/or a white filler, and (iii) fine particles having a three-dimensional crosslinked structure, in which the fine particles have been produced by three-dimensionally crosslinking a polymer composed of an oligomer or a prepolymer having, in the main chain, a sulfide bond composed of two or more sulfur atoms and/or having a thiol group. This composition, however, cannot balance the wet grip performance and the rolling resistance performance that conflict with each other.

CITATION LIST

Patent Literature

Patent document 1: Japanese Patent Laid-Open Publication No. 2017-110069
Patent document 2: Japanese Patent Laid-Open Publication No. 2019-112560
Patent document 3: Japanese Patent Laid-Open Publication No. 2017-149885

SUMMARY OF THE INVENTION

Problem to be Solved by the Invention

It is therefore an object of the present invention to provide a rubber composition which can provide a pneumatic tire having an excellent balance of the breaking properties, the rolling resistance performance (low fuel consumption) and the wet grip performance.

Means for Solving the Problem

In order to achieve the object, the present invention provides a rubber composition comprising 100 parts by mass of a diene rubber, and 1 to 100 parts by mass of fine particles (A) having a glass transition point of −70° C. to 0° C. and composed of a polymer comprising constituent units of at least one monofunctional monomer, wherein the fine particles (A) have a crosslinked structure crosslinked by at least one polyfunctional monomer having a polysulfide bond in which at least two successive sulfur atoms are bonded together.

The average particle size of the fine particles (A) may be 10 nm to 100 nm.

The polysulfide bond may be a disulfide bond.

The fine particles (A) may be composed of a polymer comprising an alkyl (meth)acrylate unit, represented by the following formula (1), as a constituent unit:

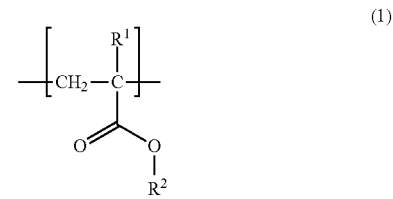

(1)

wherein $R^1$ is a hydrogen atom or a methyl group, and $R^1$s in the same molecule may be the same or different from each other; and $R^2$ is an alkyl group having 4 to 18 carbon atoms, and $R^2$s in the same molecule may be the same or different from each other.

The present invention also provides a pneumatic tire produced using the above-described rubber composition.

Advantageous Effects of the Invention

The rubber composition of the present invention can provide a pneumatic tire having an excellent balance of the breaking properties, the rolling resistance performance (low fuel consumption) and the wet grip performance.

DESCRIPTION OF EMBODIMENTS

Embodiments of the present invention will now be described in detail.

A rubber composition according to an embodiment of the present invention comprises 100 parts by mass of a diene rubber, and 1 to 100 parts by mass of fine particles (A) having a glass transition point of −70° C. to 0° C. and composed of a polymer comprising constituent units of at least one monofunctional monomer. The fine particles (A)

have a crosslinked structure crosslinked by at least one polyfunctional monomer having a polysulfide bond in which at least two successive sulfur atoms are bonded together.

Examples of the diene rubber include natural rubber (NR), synthetic isoprene rubber (IR), butadiene rubber (BR), styrene-butadiene rubber (SBR), nitrile rubber (NBR), chloroprene rubber (CR), butyl rubber (IIR), styrene-isoprene copolymer rubber, butadiene-isoprene copolymer rubber, and styrene-isoprene-butadiene copolymer rubber. These rubbers may be used either singly or in a combination of two or more. Among them, at least one rubber selected from the group consisting of NR, BR and SBR is preferred.

The above-listed exemplary diene rubbers also include modified diene rubbers which have been modified, at the molecular end or in the molecular chain, by introducing thereinto at least one functional group selected from the group consisting of a hydroxyl group, an amino group, a carboxyl group, an alkoxy group, an alkoxysilyl group, and an epoxy group. Among such modified diene rubbers, a modified SBR and/or a modified BR is preferred. In some embodiments, the diene rubber may be a single modified diene rubber or a blend of a modified diene rubber and an unmodified diene rubber. In some embodiments, the diene rubber may comprise a modified SBR in an amount of not less than 30 parts by mass per 100 parts by mass of the diene rubber, or may comprise 50 to 90 parts by mass of a modified SBR and 50 to 10 parts by mass of an unmodified diene rubber (e.g. BR and/or NR).

While no particular limitation is placed on the glass transition point (Tg) of the fine particles (A) according to this embodiment as long as it falls within the range of −70° C. to 0° C., it is preferably −50° C. to −10° C., more preferably −40° C. to −20° C. The glass transition point can be set or adjusted e.g. through the composition of monomers constituting the polymer. When the glass transition point is not more than 0° C., deterioration in the low-temperature performance can be more effectively prevented. When the glass transition point is not less than −70° C., the effect of enhancing the wet grip performance can be increased. As used herein, the glass transition point refers to a value as measured by differential scanning calorimetry (DSC) according to JIS K 7121 (temperature increase rate: 20° C./min, temperature measurement range: −150° C. to 150° C.).

The fine particles (A) are composed of a polymer having a crosslinked structure crosslinked by at least one polyfunctional monomer having a polysulfide bond in which at least two successive sulfur atoms are bonded together.

There is no particular limitation on the polyfunctional monomer; a polyfunctional monomer having a polysulfide bond and having at least two polymerizable functional groups can be used.

The polysulfide bond can be exemplified by a disulfide bond, a trisulfide bond, and a tetrasulfide bond. Among them, a disulfide bond is preferred.

The polymerizable functional group can be exemplified by a (meth)acryloyl group, a vinyl group, and a vinyl ketone group.

Examples of the polyfunctional monomer include bis(2-(meth)acryloyl)oxyethyl disulfide, bis(2-(meth)acryloyl) oxyethyl trisulfide, bis(2-(meth)acryloyl)oxyethyl tetrasulfide, bis(2-(meth)acryloyl)oxymethyl disulfide, bis(2-(meth) acryloyl)oxymethyltrisultide, bis(2-(meth)acryloyl) oxymethyl tetrasulfide, bis(2-(meth)acryloyl)oxypropyl disulfide, bis(2-(meth)acryloyl)oxypropyl trisulfide, bis(2-(meth)acryloyl)oxypropyl tetrasulfide, bis(2-(meth)acryloyl)oxybutyl disulfide, bis(2-(meth)acryloyl)oxybutyl trisulfide, bis(2-(meth)acryloyl)oxybutyl tetrasulfide, diallyl disulfide, diallyl trisulfide, diallyl tetrasulfide, divinyl disulfide, divinyl trisulfide, divinyl tetrasulfide, bis(3-butenyl) disulfide, bis(3-butenyl) trisulfide, bis(3-butenyl) tetrasulfide, bis(1-pentene-3-one) disulfide, bis(1-pentene-3-one) trisulfide, bis(1-pentene-3-one) tetrasulfide, bis(1-heptene-3-one) disulfide, bis(1-heptene-3-one) trisulfide, bis(1-heptene-3-one) tetrasulfide, bis(1-octene-3-one) disulfide, bis (1-octene-3-one) trisulfide, bis(1-octene-3-one) tetrasulfide, etc.

While there is no particular limitation on the average particle size of the fine particles (A), it is preferably 10 nm to 100 nm, more preferably 20 nm to 80 nm. As used herein, the average particle size of the fine particles (A) refers to the average particle size (latex particle size (ML)) of polymer particles dispersed in a latex, determined by the cumulant method. In particular, the average particle size refers to a particle diameter at a 50% integrated value (D50: 50% diameter) in a particle size distribution obtained by dynamic light scattering (DLS), and is a value determined by the cumulant method from an autocorrelation function obtained by a photon correlation method (JIS Z 8826, the angle between incident light and detector: 90°).

The use of the fine particles (A), composed of the polymer having a polysulfide bond, in the rubber composition of this embodiment can provide a pneumatic tire having excellent breaking properties. Though the mechanism is not clear, it may be considered that the polysulfide bond of the polyfunctional monomer forming a crosslinked structure cleaves upon vulcanization and the polymer binds to the rubber, leading to enhanced breaking properties.

The fine particles (A) according to this embodiment is preferably composed of a (meth)acrylate polymer comprising an alkyl (meth)acrylate unit, represented by the following formula (1), as a constituent unit:

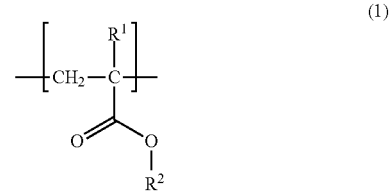

wherein $R^1$ is a hydrogen atom or a methyl group, and $R^1$s in the same molecule may be the same or different from each other; and $R^2$ is an alkyl group having 4 to 18 carbon atoms, and $R^2$s in the same molecule may be the same or different from each other. $R^2$ is preferably an alkyl group having 6 to 16 carbon atoms, more preferably an alkyl group having 8 to 15 carbon atoms.

As used herein, the term "(meth)acrylate" refers to one or both of an acrylate and a methacrylate. The term "(meth) acrylic acid" refers to one or both of acrylic acid and methacrylic acid.

Examples of the alkyl (meth)acrylate include n-alkyl (meth)acrylates such as n-butyl acrylate, n-pentyl acrylate, n-hexyl acrylate, n-heptyl acrylate, n-octyl acrylate, n-nonyl acrylate, n-decyl acrylate, n-undecyl acrylate, n-dodecyl acrylate, n-tridecyl acrylate, n-butyl methacrylate, n-pentyl methacrylate, n-hexyl methacrylate, n-heptyl methacrylate, n-octyl methacrylate, n-nonyl methacrylate, n-decyl methacrylate, n-undecyl methacrylate, and n-dodecyl methacrylate; isoalkyl (meth)acrylates such as isobutyl acrylate, isopentyl acrylate, isohexyl acrylate, isoheptyl acrylate, isooctyl acrylate, isononyl acrylate, isodecyl acrylate, isoundecyl acrylate, isododecyl acrylate, isotridecyl acrylate, isotetradecyl acrylate, isobutyl methacrylate, isopentyl methacrylate, isohexyl methacrylate, isoheptyl methacrylate, isooetyli methacrylate, isononyl methacrylate, isodecyl methacrylate, isoundecyl methacrylate, isododecyl methacrylate, isotridecyl methacrylate, and isotetradecyl methacrylate; 2-methylbutyl acrylate, 2-ethylpentyl acrylate, 2-methylhexyl acrylate, 2-ethylhexyl acrylate, 2-ethyheptyl acrylate, 2-methylpentyl methacrylate, 2-methylhexyl methacrylate, 2-ethylhexyl methacrylate, and 2-ethylheptyl methacrylate. These compounds may be used either singly or in a combination of two or more.

As used herein, the term "isoalkyl" refers to an alkyl group having a methyl side chain on the second carbon atom from the end of the alkyl chain. For example, "isodecyl" refers to an alkyl group having 10 carbon atoms, which has a methyl side chain on the second carbon atom from the end of the alkyl chain, and conceptually includes not only an 8-methylnonyl group but a 2,4,6-trimethylheptyl group as well.

While there is no particular limitation, in the (meth)acrylate polymer, the molar ratio of the constituent unit of the formula (1) to all the constituent units (all the repeating units) constituting the (meth)acrylate polymer is preferably not less than 50 mol %, more preferably not less than 80 mol %, and even more preferably not less than 90 mol %. While there is no particular limitation on the upper limit of the molar ratio of the constituent unit of the formula (1), it may be not more than 99.5 mol %, or not more than 99 mol %. The molar ratio of the constituent unit based on the polyfunctional monomer may be 0.5 to 20 mol %, or 1 to 10 mol %, or 1 to 5 mol %.

The fine particles (A) according to an embodiment is preferably composed of a polymer having, as the constituent unit represented by the formula (1), a constituent unit represented by the following general formula (2):

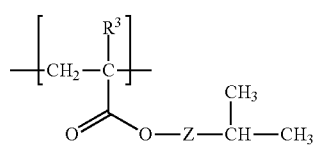

(2)

wherein $R^3$ is a hydrogen atom or a methyl group (preferably a methyl group), and $R^3$s in the same molecule may be the same or different from each other. Z is an alkylene group having 1 to 15 carbon atoms, and Zs in the same molecule may be the same or different from each other. Z may be either linear or branched.

The constituent unit of the formula (2) corresponds to the case where $R^2$ in the formula (1) is represented by the following general formula (2A):

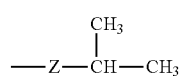

(2A)

wherein Z is the same as the Z of the formula (2).

The (meth)acrylate that produces such a constituent unit can be exemplified by the above-listed isoalkyl (meth)acrylates. The use of such a (meth)acrylate (preferably a methacrylate) having an isoalkyl group can enhance the effect of this embodiment. Z in the formulae (2) and (2A) is preferably an alkylene group having 5 to 12 carbon atoms, more preferably an alkylene group having 6 to 10 carbon atoms. An alkylene group having 7 carbon atoms is most preferred. Thus, an exemplary preferable (meth)acrylate polymer is a polymer comprising an isodecyl methacrylate monomer.

The fine particles (A) according to another embodiment may be composed of a polymer having, as the constituent unit represented by the formula (1), a constituent unit represented by the following general formula (3), or a constituent unit represented by the formula (2) and a constituent unit represented by the formula (3). In the latter case, the addition of these constituent units may be by random addition or block addition, preferably by random addition.

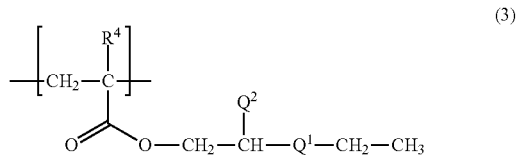

(3)

wherein $R^4$ is a hydrogen atom or a methyl group (preferably a methyl group), and $R^4$s in the same molecule may be the same or different from each other. $Q_1$ is an alkylene group having 1 to 6 (preferably 1 to 3) carbon atoms, and may be either linear or branched (preferably linear). $Q^1$s in the same molecule may be the same or different from each other. $Q^2$ is a methyl group or an ethyl group (preferably an ethyl group), and $Q^2$s in the same molecule may be the same or different from each other.

The constituent unit of the formula (3) corresponds to the case where $R^2$ in the formula (1) is represented by the following general formula (3A):

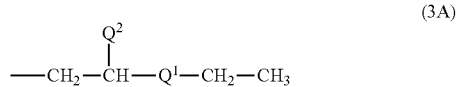

(3A)

wherein $Q^1$ and $Q^2$ are the same as the $Q^1$ and $Q^2$, respectively, of the formula (3).

There is no particular limitation on a method for producing the fine particles (A) according to this embodiment; for example, the fine particles (A) can be synthesized by using known emulsion polymerization techniques. The following is an exemplary preferable method: An alkyl (meth)acrylate, together with a polyfunctional monomer as a crosslinking agent, is dispersed in an aqueous medium, such as water, in which an emulsifier is dissolved. A water-soluble radical polymerization initiator (e.g. a peroxide such as potassium persulfate) is added to the resulting emulsion to initiate radical polymerization. In this manner, polymer particles composed of an alkyl (meth)acrylate polymer are produced in the aqueous medium. Fine particles are obtained through separation from the aqueous medium. The fine particles (A) can also be produced by using other known polymerization methods such as suspension polymerization, dispersion polymerization, precipitation polymerization, mini-emulsion polymerization, soap-free emulsion polymerization (emulsifier-free emulsion polymerization), and micro-emulsion polymerization.

In the rubber composition according to this embodiment, the amount of the fine particles (A) is 1 to 100 parts by mass, preferably 2 to 50 parts by mass, more preferably 3 to 30 parts by mass per 100 pars by mass of the rubber component composed of the diene rubber.

Besides the fine particles (A), the rubber composition according to this embodiment may further contain additives commonly used in rubber compositions, such as a reinforcing filler, a silane coupling agent, an oil, zinc flower, stearic acid, an antioxidant, wax, a vulcanizing agent, and a vulcanization accelerator.

Silica such as wet silica (hydrated silica) or carbon black, for example, can be used as the reinforcing filler. In order to enhance the balance between the rolling resistance performance and the wet grip performance, silica is preferably used either singly or in combination with carbon black. There is no particular limitation on the amount of the reinforcing filler, for example, it may be 20 to 150 parts by mass, or 30 to 100 parts by mass per 100 pars by mass of the rubber component. There is also no particular limitation on the amount of silica; for example, it may be 20 to 150 parts by mass, or 30 to 100 parts by mass per 100 pars by mass of the rubber component.

In the case of using silica, it is preferred to use it in combination with a silane coupling agent. In that case, the amount of the silane coupling agent is preferably 2 to 20% by mass, more preferably 4 to 15% by mass of the amount of silica.

Sulfur is preferably used as the vulcanizing agent. While there is no particular limitation on the amount of the vulcanizing agent, it is preferably 0.1 to 10 parts by mass, more preferably 0.5 to 5 parts by mass per 100 parts by mass of the rubber component. A variety of vulcanization accelerators, including sulfene amide-type, thiuram-type, thiazole-type and guanidine-type, can be used as the vulcanization accelerator either singly or in a combination of two or more. While there is no particular limitation on the amount of the vulcanization accelerator, it is preferably 0.1 to 7 parts by mass, more preferably 0.5 to 5 parts by mass per 100 parts by mass of the rubber component.

The rubber composition according to this embodiment can be produced by mixing the components by a common method using a common mixing machine such as a Banbury mixer, a kneader or rolls. Thus, for example, the rubber composition can be prepared by adding the fine particles (A) and additives, other than a vulcanizing agent and a vulcanization accelerator, to the diene rubber and mixing the components in a first mixing step, and then adding the vulcanizing agent and the vulcanization accelerator to the resulting mixture and mixing the components in a final mixing step.

The thus-obtained rubber composition can be used for pneumatic tires for various applications and having various sizes, such as tires for cars and large tires for trucks and buses, and can be applied in various portions, including a tread portion and a side wall portion, of such a tire. A pneumatic tire can be produced by first molding the rubber composition into a predetermined shape by a common method, such as extrusion, to produce a green tire and, after combining it with other parts, subjecting it to a vulcanization/molding process e.g. at 140 to 180° C. The rubber composition is especially preferably used for a tread portion of a tire.

EXAMPLES

The following examples illustrate the present invention in greater detail and are not intended to limit the scope of the invention.

[Average Particle Size Measuring Method]

The average particle size of the fine particles (A) refers to a particle diameter at a 50% integrated value (D50: 50% diameter) in a particle size distribution obtained by dynamic light scattering (DIS), and was measured on latex solutions as a measurement sample before coagulation, obtained in the following Synthetic Examples, by a photon correlation method (JIS Z 8826, the angle between incident light and detector: 90°) using a light scattering photometer "DIS-8000" manufactured by Otsuka Electronics Co., Ltd.

[Tg Measuring Method]

The glass transition point (Tg) of the fine particles (A) was measured by differential scanning calorimetry (DSC) according to JIS K 7121 (temperature increase rate: 20° C./min, temperature measurement range: −150° C. to 150° C.).

Synthesis Example 1: Fine Particles 1

45.0 g of 2,4,6-trimethylheptyl methacrylate (isodecyl methacrylate), 0.40 g of ethylene glycol dimethacrylate, 5.73 g of sodium dodecyl sulfate, 90.0 g of water and 10.0 g of ethanol were mixed and stirred for one hour to emulsify the monomer, and 0.54 g of potassium persulfate was added to the emulsion. Thereafter, nitrogen bubbling was performed for 20 minutes, and the solution was stirred at 70° C. for one hour to obtain a latex solution. The latex solution was poured into methanol while stirring it to precipitate the polymer. Thereafter, the liquid was removed by filtration, and the residue was dried in a vacuum drier under the conditions of 70° C. and $1.0 \times 10^3$ Pa to obtain fine particles 1 as a solid component. The average particle size of the fine particles 1 was 51 nm, and the Tg was −40° C.

Synthesis Example 2: Fine Particles 2

Fine particles 2 were produced in the same manner as in Synthesis Example 1 except for changing the amount of ethylene glycol dimethacrylate, used in the synthesis of the fine particles 1, to 1.18 g. The average particle size of the line particles 2 was 55 nm, and the Tg was −39° C.

Synthesis Example 3: Fine Particles 3

Fine particles 3 were produced in the same manner as in Synthesis Example 1 except for using 0.58 g of bis(2-methacryloyl)oxyethyl disulfide instead of ethylene glycol dimethacrylate used in the synthesis of the fine particles 1. The average particle size of the fine particles 3 was 48 nm, and the Tg was −39° C.

Synthesis Example 4: Fine Particles 4

Fine particles 4 were produced in the same manner as in Synthesis Example 1 except for using 1.73 g of bis(2-methacryloyl)oxyethyl disulfide instead of ethylene glycol dimethacrylate used in the synthesis of the fine particles 1. The average particle size of the fine particles 4 was 54 nm, and the Tg was −37° C.

Synthesis Example 5: Fine Particles 5

Fine particles 5 were produced in the same manner as in Synthesis Example 1 except for changing the amount of ethylene glycol dimethacrylate, used in the synthesis of the fine particles 1, to 0.59 g, and concurrently using 0.86 g of bis(2-methacryloyl)oxyethyl disulfide. The average particle size of the fine particles 5 was 51 nm, and the Tg was −38° C.

Using a laboratory mixer and following the formulations (parts by mass) shown in Table 1 below, compounding ingredients other than sulfur and a vulcanization accelerator were first added to the diene rubber component and the components were mixed in a first mixing step (discharge temperature=160° C.). Subsequently, sulfur and the vulcanization accelerator were added to the resulting mixture and mixing of the components was performed in a final mixing step (discharge temperature=90° C.), thereby preparing a rubber composition. The following are details of the components listed in Table 1.

Modified SBR: "HPR350" manufactured by JSR Corporation

BR: "BR1503" manufactured by LIBE Industries, Ltd.

Silica: "Nipsil AQ" manufactured by Tosoh Silica Corporation

Silane coupling agent: Bis(3-triethoxysilylpropyl)tetrasulfide "Si69" manufactured by Evonik Japan Co., Ltd.

Fine particles 1 to 5: the fine particles obtained in Synthesis Examples 1 to 5

Zinc flower: "Zinc Flower Type 1" manufactured by Mitsui Mining & Smelting Co., Ltd.

Antioxidant: "NOCRAC 6C" manufactured by Ouchi Shinko Chemical Industrial Co., Ltd.

Stearic acid: "LUNAC S-20" manufactured by Kao Corporation

Sulfur: "Powdered sulfur for rubber 150 mesh" manufactured by Hosoi Chemical Industry Co., Ltd.

Vulcanization accelerator: "NOCCELER CZ" manufactured by Ouchi Shinko Chemical Industrial Co., Ltd.

Secondary vulcanization accelerator: "NOCCELER. D" manufactured by Ouchi Shinko Chemical Industrial Co., Ltd.

Each of the rubber compositions obtained was vulcanized at 160° C. for 20 minutes to produce a specimen having a predetermined shape. For each of the specimens thus obtained, a dynamic viscoelasticity test was performed to measure the tan δ at 0° C. and the tan S at 60° C. Further, a tensile strength test was performed on each specimen to measure the tensile strength and the elongation at break. The measurements were performed by the following methods.

Tensile strength and elongation at break: A tensile test was performed according to JIS K 6251 (using a dumbbell-shaped No. 3 specimen) to measure a tensile strength and an elongation at break. Each of the measured values is expressed as an index number relative to the value of Comparative Example 1 expressed as 100. The higher the index number, the superior the breaking property.

0° C. tan δ: Using "Rheospectrometer E4000" manufactured by UBM, a loss factor tan δ was measured under the conditions: frequency 10 Hz, static strain 10%, dynamic strain 2%, and temperature 0° C. The measured value is expressed as an index number relative to the value of Comparative Example 1 expressed as 100. A higher index number indicates a higher tan δ and superior wet grip performance.

60° C. tan δ: Measurement of tan δ was performed in the same manner as in the above "0° C. tan δ" measurement except for changing the temperature to 60° C. The measured value is expressed as an index number relative to the value of Comparative Example 1 expressed as 100. A lower index number indicates that the rubber composition generates less heat, and that the rubber composition provides a tire having lower rolling resistance and thus having superior rolling resistance performance (superior low-fuel consumption performance).

TABLE 1

|  | Comp. Ex. 1 | Comp. Ex. 2 | Comp. Ex. 3 | Ex. 1 | Ex. 2 | Ex. 3 |
|---|---|---|---|---|---|---|
| Modified NR | 60 | 60 | 60 | 60 | 60 | 60 |
| BR | 40 | 40 | 40 | 40 | 40 | 40 |
| Silica | 60 | 60 | 60 | 60 | 60 | 60 |
| Silane coupling agent | 4.8 | 4.8 | 4.8 | 4.8 | 4.8 | 4.8 |
| Fine particles 1 | — | 10 | — | — | — | — |
| Fine particles 2 | — | — | 10 | — | — | — |
| Fine particles 3 | — | — | — | 10 | — | — |
| Fine particles 4 | — | — | — | — | 10 | — |
| Fine particles 5 | — | — | — | — | — | 10 |
| Zinc flower | 2 | 2 | 2 | 2 | 2 | 2 |
| Antioxidant | 2 | 2 | 2 | 2 | 2 | 2 |
| Stearic acid | 2 | 2 | 2 | 2 | 2 | 2 |
| Sulfur | 1.8 | 1.8 | 1.8 | 1.8 | 1.8 | 1.8 |
| Vulcanization accelerator | 1.8 | 1.8 | 1.8 | 1.8 | 1.8 | 1.8 |
| Secondary vulcanization accelerator | 1.5 | 1.5 | 1.5 | 1.5 | 1.5 | 1.5 |
| Tensile strength | 100 | 94 | 90 | 101 | 104 | 102 |
| Elongation at break | 100 | 96 | 91 | 102 | 101 | 100 |
| 0° C. tan δ | 100 | 131 | 139 | 138 | 148 | 145 |
| 60° C. tan δ | 100 | 94 | 93 | 92 | 87 | 86 |

The results are shown in Table 1 above. As can be seen from comparison of Comparative Examples 1 to 3 with Examples 1 to 3, the rubber compositions containing the fine particles (A) according to the present invention can achieve an excellent balance of the breaking properties, the rolling resistance performance (low fuel consumption) and the wet grip performance.

As can be seen from comparison of Comparative Example 1 with Comparative Examples 2 and 3, the use of the fine particles having no polysulfide bond deteriorates the tensile strength and the elongation at break.

INDUSTRIAL APPLICABILITY

The rubber composition of the present invention can be used for various tires, such as tires for cars and tires for light trucks or buses.

What is claimed is:

1. A rubber composition comprising 100 parts by mass of a diene rubber, and 1 to 100 parts by mass of fine particles (A) having a glass transition point of −70° C. to 0° C. and composed of a polymer comprising constituent units of at least one monofunctional monomer, wherein the fine particles (A) have a crosslinked structure crosslinked by at least one polyfunctional monomer having a polysulfide bond in which at least two successive sulfur atoms are bonded together.

2. The rubber composition according to claim 1, wherein the average particle size of the fine particles (A) is 10 nm to 100 nm.

3. The rubber composition according to claim 1, wherein the polysulfide bond is a disulfide bond.

4. The rubber composition according to claim 2, wherein the polysulfide bond is a disulfide bond.

5. The rubber composition according to claim 1, wherein the fine particles (A) are composed of a polymer comprising an alkyl (meth)acrylate unit, represented by the following formula (1), as a constituent unit:

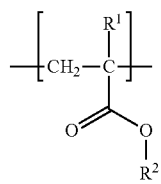

wherein $R^1$ is a hydrogen atom or a methyl group, and $R^1$s in the same molecule may be the same or different from each other; and $R^2$ is an alkyl group having 4 to 18 carbon atoms, and $R^2$s in the same molecule may be the same or different from each other.

6. The rubber composition according to claim 2, wherein the fine particles (A) are composed of a polymer comprising an alkyl (meth)acrylate unit, represented by the following formula (1), as a constituent unit:

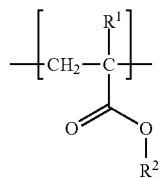

wherein $R^1$ is a hydrogen atom or a methyl group, and $R^1$s in the same molecule may be the same or different from each other; and $R^2$ is an alkyl group having 4 to 18 carbon atoms, and $R^2$s in the same molecule may be the same or different from each other.

7. The rubber composition according to claim 3, wherein the fine particles (A) are composed of a polymer comprising an alkyl (meth)acrylate unit, represented by the following formula (1), as a constituent unit:

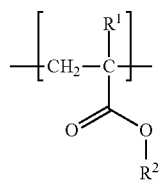

wherein R is a hydrogen atom or a methyl group, and $R^1$s in the same molecule may be the same or different from each other; and $R^2$ is an alkyl group having 4 to 18 carbon atoms, and $R^2$s in the same molecule may be the same or different from each other.

8. The rubber composition according to claim 4, wherein the fine particles (A) are composed of a polymer comprising an alkyl (meth)acrylate unit, represented by the following formula (1), as a constituent unit:

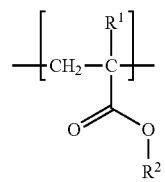

wherein $R^1$ is a hydrogen atom or a methyl group, and $R^1$s in the same molecule may be the same or different from each other; and $R^2$ is an alkyl group having 4 to 18 carbon atoms, and $R^2$s in the same molecule may be the same or different from each other.

9. A pneumatic tire produced using the rubber composition according to claim 1.

10. A pneumatic tire produced using the rubber composition according to claim 2.

11. A pneumatic tire produced using the rubber composition according to claim 3.

12. A pneumatic tire produced using the rubber composition according to claim 4.

13. A pneumatic tire produced using the rubber composition according to claim 5.

14. A pneumatic tire produced using the rubber composition according to claim 6.

15. A pneumatic tire produced using the rubber composition according to claim 7.

16. A pneumatic tire produced using the rubber composition according to claim 8.

* * * * *